United States Patent
Ghai et al.

(10) Patent No.: US 8,234,704 B2
(45) Date of Patent: Jul. 31, 2012

(54) PHYSICAL ACCESS CONTROL AND SECURITY MONITORING SYSTEM UTILIZING A NORMALIZED DATA FORMAT

(75) Inventors: Vikrant Ghai, Fremont, CA (US); Shailendra Sharma, Milpitas, CA (US); Ajay Jain, San Jose, CA (US)

(73) Assignee: Quantum Security, Inc., San Jose, CA (US)

( * ) Notice: Subject to any disclaimer, the term of this patent is extended or adjusted under 35 U.S.C. 154(b) by 1051 days.

(21) Appl. No.: 11/893,057

(22) Filed: Aug. 14, 2007

(65) Prior Publication Data

US 2008/0209506 A1 Aug. 28, 2008

Related U.S. Application Data

(60) Provisional application No. 60/837,755, filed on Aug. 14, 2006.

(51) Int. Cl.
*G06F 21/00* (2006.01)
(52) U.S. Cl. .......................................................... 726/16
(58) Field of Classification Search ................ 726/1, 16; 713/168, 182; 707/19
See application file for complete search history.

(56) References Cited

U.S. PATENT DOCUMENTS

| | | | | |
|---|---|---|---|---|
| 4,148,012 | A * | 4/1979 | Baump et al. | ................ 340/5.33 |
| 4,839,640 | A * | 6/1989 | Ozer et al. | ................... 340/5.33 |
| 6,233,588 | B1 | 5/2001 | Marchoili et al. | |
| 6,477,434 | B1 * | 11/2002 | Wewalaarachchi et al. | ..... 700/83 |
| 2002/0077996 | A1 | 6/2002 | Regelski et al. | |
| 2003/0023874 | A1 | 1/2003 | Prokupets et al. | |
| 2004/0059814 | A1 * | 3/2004 | Komiya et al. | ................ 709/224 |
| 2004/0263314 | A1 | 12/2004 | Dorai et al. | |
| 2005/0143863 | A1 * | 6/2005 | Ruane et al. | ................... 700/276 |
| 2007/0011460 | A1 | 1/2007 | Brennan et al. | |
| 2007/0186106 | A1 | 8/2007 | Ting et al. | |

* cited by examiner

*Primary Examiner* — Kim Vu
*Assistant Examiner* — John B King
(74) *Attorney, Agent, or Firm* — Dergosits & Noah LLP; Geoffrey T. Staniford

(57) ABSTRACT

Embodiments disclose a system and method for the integration of data and events to and from physical access control and security monitoring systems that is normalized to standardized definition for enforcement of standardized rules, created through a visual policy editor, affecting persistence, propagation of data and generation of alerts and notifications for physical security, network and IT systems. Data from disparate physical security systems is normalized for visual rule creation by rule object shapes representing normalized security systems, data and processes. A rules-based policy engine enforces security policies and generates actionable events. The overall system provides an integration platform, methods and processes for normalizing data from physical security systems, representation of physical security systems, data and processes for visual creation of rules using defined stencil objects, generating formatted rules, and enforcing these rules in real-time on security systems data and events.

15 Claims, 13 Drawing Sheets

400

PHYSICAL ACCESS CONTROL AND SECURITY MONITORING SYSTEM UTILIZING A NORMALIZED DATA FORMAT

CROSS-REFERENCE TO RELATED APPLICATIONS

The present application claims the benefit of the U.S. Provisional Application Ser. No. 60/837,755 entitled "Method, process, system and apparatus for normalization of data and events from disparate Physical Access Control and Security Monitoring Systems for enforcement of standardized Rules, created through Visual Policy editor, affecting persistence, propagation of data and generation of alerts and notifications for physical security, network and IT systems" and filed on Aug. 14, 2006. The present application is related to co-pending U.S. patent application entitled "Policy-Based Physical Security System for Restricting Access to Computer Resources and Data Flow Through Network Equipment" filed concurrently herewith.

TECHNICAL FIELD

The embodiments provided herein relate generally to physical security systems, and more specifically to a system for integrating disparate security systems using a rules-based policy engine and normalized data format.

BACKGROUND

Physical security systems include equipment and processes that implement physical security measures for incidents, access control, monitoring systems, lighting, security, audits, inspection, facility management, building automation, and the like. Almost all businesses, large commercial and government facilities, and many homes utilize physical security systems to alert owners and operators about potentially harmful activities such as intrusion, theft, fire, flooding, gas leaks, and so on. Such systems typically comprise sensors, alarm units and control systems that provide proprietary methods of control and feedback data formats using different communication for different alarm events. Many large businesses and entities also employ access control systems that monitor and control personnel access to physical resources such as buildings and offices, and even asset movement (e.g., products or material) to and from the premises. These systems generally include a proprietary repository of individual records and access privileges and control access control hardware such as readers (e.g., for access cards, biometric sensors, etc.) and controllers (e.g., door controllers) for allowing or disallowing access to physical resources and/or areas of a building.

Many different physical security systems are available on the market, and are manufactured by a variety of vendors, each of which may have its own standards of data representation and exchange. Large entities, such as big corporations or government departments may utilize multiple physical access control systems distributed across the world, or even within certain locations, such as a single building. These can have multiple representations of individuals or assets, and non-uniform policies for access to physical resources. Besides the representation of entities within the system, alarm triggering events can also be represented differently among different vendors, or even within different security systems from a single vendor. The access and alarm events from different physical security systems generally do not follow standard definitions. This prevents the creation of uniform policy, enforcement and compliance procedures across corporations and multiple systems.

Some attempts have been made to standardize the communication protocols between various building automation systems. One such communications protocol is BACnet, for automation and control systems for HVAC (heating ventilating and air conditioning), lighting control, etc. Such communication standards, however, are limited to building automation functions and do not provide seamless integration with other physical security or network security control systems.

What is needed, therefore, is a system that defines a uniform data format for the entities and events controlled by disparate physical security systems. What is further needed is a system that allows the definition of data and events along policy rules enforced in real-time by a policy engine within an integrated physical security environment.

What is further needed is a system and process to define physical security, network and IT system as visual objects to be used in a visual policy creation tool that is used to diagrammatically define physical security policies and enforce them on disparate security systems, data changes and events, and to translate the visual policies to standardized rules format that can be enforced in real-time by a policy engine.

BRIEF DESCRIPTION OF THE DRAWINGS

Embodiments are illustrated by way of example and not limitation in the figures of the accompanying drawings, in which like references indicate similar elements and in which.

INCORPORATION BY REFERENCE

Each publication, patent, and/or patent application mentioned in this specification is herein incorporated by reference in its entirety to the same extent as if each individual publication and/or patent application was specifically and individually indicated to be incorporated by reference.

DETAILED DESCRIPTION

Embodiments disclose a system and method for the integration of data and events from physical access control and security monitoring systems that are normalized to a standardized definition for enforcement of standardized rules, created through a visual policy editor, affecting persistence, propagation of data and generation of alerts and notifications for physical security, network and IT systems. Data from disparate physical security systems is normalized for visual rule creation by rule object shapes representing normalized security systems, data and processes. A rules-based policy engine enforces security policies and generates actionable events. The overall system provides an integration platform, methods and processes for normalizing data from physical security systems, representation of physical security systems, data and processes for visual creation of rules using defined stencil objects, generating formatted rules, and enforcing these rules in real-time on security systems data and events. Rules' actions additionally use the integration platform to distribute these normalized events to various applications, systems and devices to affect the behavior of external systems and processes based on physical security systems' data and events.

The overall system provides an integration platform, methods and processes for normalizing and correlating data from different applications and external systems for integration with physical security systems' data and processes using defined rule stencil objects for visual creation of rules, generating formatted rules, and enforcing these rules in real-time to affect the state of physical security systems data and events.

In the following description, numerous specific details are introduced to provide a thorough understanding of, and enabling description for, embodiments of an integrated physical security monitoring and control system. One skilled in the relevant art, however, will recognize that these embodiments can be practiced without one or more of the specific details, or with other components, systems, and so on. In other instances, well-known structures or operations are not shown, or are not described in detail, to avoid obscuring aspects of the disclosed embodiments.

Figure 1A:
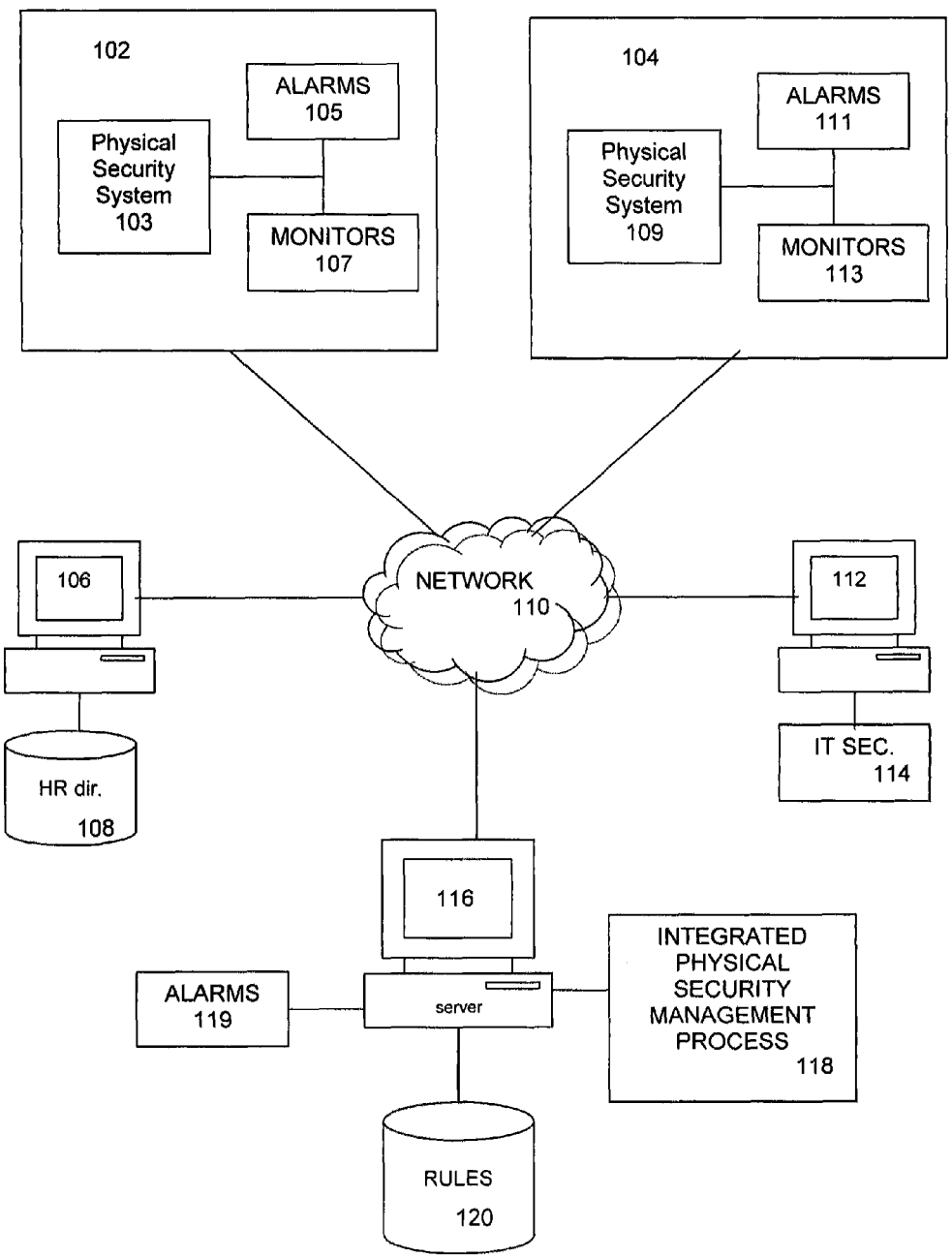
FIG. 1A is a block diagram of a computer network that implements an integrated policy-based physical security management system, under an embodiment.

Aspects of the one or more embodiments described herein may be implemented on one or more computers executing software instructions. Such computers are typically distributed among different facilities in a wide-area or even global-scale network that may be connected in a client-server arrangement or similar distributed computer network. FIG. 1A illustrates a computer network system 100 that implements one or more embodiments. In system 100, a network server computer 116 is coupled, directly or indirectly, to one or more network client computers or computing devices through a network 110. The network interface between server computer 104 and the client computers may include one or more routers that serve to buffer and route the data transmitted between the server and client computers, and network 110 may be the Internet, a Wide Area Network (WAN), a Local Area Network (LAN), or any combination thereof.

One or more of the network client computers may be deployed in a building or facility that is used by a business or as a residence, to control one or more computer-based physical security systems. Thus, as shown in FIG. 1A, facility 102 contains a physical security system 102 that controls security elements, such as access control, alarms 105, and monitors and sensors 107. Facility 102 may represent a house or office building, or any other type of structure that contains some level of physical security infrastructure. The alarm and monitor elements of the physical security systems represent various access control, monitoring, surveillance, sensor, or other asset protection mechanisms that may be employed throughout the facility. These can be independent elements that are configured to detect and report different types of events, such as fire, gas leaks, intrusion, computer hacking, physical proximity, and any other similar type of event. Such systems can thus be used to control personnel access within a facility and to detect unauthorized access by inside or outside personnel, as well as to detect natural events, such as fires, earthquakes, etc. Detection of any such event can be used to alert proper officials and/or automatically invoke protection mechanisms, such physical shutdown, backup of computers, turning on lights, and so on.

In one embodiment, the physical security system 103 embodies physical access control systems (PACS) that allow access to physical facilities of an organization or entity (government, commercial, or private). These systems allow users to gain access to resources, location and assets of the entity through various access means, such as ID's, access cards, passwords, biometric data, and so on. In one embodiment, the physical security system 103 may be a managed physical security system (MPSS) that is managed by a standard policy-based software application to apply uniform corporate security policies. These can include any system that is employed for ensuring physical security of personnel and assets as well as monitoring of incidents and activity plus automation of building management and environment control systems.

Facility 104 represents another possible facility that includes its own physical security system 109 that controls respective alarm 111 and monitoring 113 subsystems. In general, the physical security systems deployed by each facility may be provided by different vendors and therefore produce data that is unique or proprietary. Indeed, even a system within a particular facility may need to deal with disparate types of data from the various alarms and monitors within the facility.

The physical security system 103 can be embodied in a client computer that is a workstation or personal computer (PC) class computer. Alternatively, such a system can also be implemented on any type of computing device or a mobile computing or communication device, such as a notebook computer, personal digital assistant (PDA), mobile phone, game console, or any similar class of mobile computing device with sufficient processing, communication, and control or AV (audiovisual) playback capability.

In one embodiment, server 116 in network system 100 is a server computer that executes an integrated physical security management process 118. This process generally comprises hardware and/or software components to achieve integration, normalization, rules creation and processing of physical security systems data and events in different facilities, such as facilities 102 and 104. The integrated physical security management process includes functional components that perform the tasks of integrating non-standard and proprietary data from disparate and numerous sensor, alarm and monitoring systems within and among different facilities. In one embodiment, the integrated physical security management process 118 includes a normalization process that normalizes of disparate security systems data to a standard data format, for example, access control and alarm data. It also includes processes to generate unique physical access credentials to provide an exclusive mapping between an individual's profile (job, department, location, and so on) and an organization's spatial hierarchy of its global physical security system deployments (doors, buildings, lockers, safes, and so on). For personnel control, the integrated physical security management process 118 is configured to generate unique physical access credentials based on individual profiles to automatically assign credentials across multiple global physical security systems to overcome certain limitations (e.g., memory constraints) of standard access control systems. The process stores and provides uniform access of cross system data in normalized form. For this embodiment, certain information regarding human resources (HR), such as organizational charts, privileges, passwords and so on may be provided by an external data source, such as data store 108 coupled to a separate server computer 106.

To facilitate creation and deployment, physical and IT (information technology) security systems are created through object stencils for use with visual policy editors. A central rules engine is included for the creation of standard rules and actions on physical security system data with visual policy editors generating a formatted rule (for example in XML format) for the rules engine. The process 118 allows for processing of rules in real-time to generate actions affecting access control systems and other integrated network and IT management systems or applications, and it provides rules-based workflows across integrated physical security, networking and IT systems. Where appropriate, the process 118 provides integration with industry standard systems to provide actionable event data. For this embodiment, certain information regarding the IT components (such as LAN and WAN network topographies, computer specifications, user names/passwords, and so on), may be provided by an external data source, such as data store 114 coupled to a separate server computer 112.

The application of the integrated physical security management process to IT applications is an important aspect of the overall integration feature of system 100. Information Technology includes many aspects of computing technology to serve the computing, communication and data storage needs of an organization. These include database systems and management, computer networking, software application, and management information systems. Thus, IT systems span a variety of computers and computer software to convert, store, protect, process, transmit and retrieve information. Examples of IT systems include corporate directory servers that contain listing and information on an organization's users and other assets, and information from which can be obtained by other applications using various standard protocols such LDAP (Lightweight Directory Access Protocol). Another example are corporate data repositories, which include small to large database systems that contain various informational, transactional and audit data stored by various applications and users of the data, and human resources systems, which are applications and data repositories that contain corporate personnel information and data. IT systems also include e-mail servers, which are applications and servers that enable email communication, and web applications and servers that are made available to end-users to be used with standard web browsers.

In one embodiment, the server computer 116 includes an optional World-Wide Web (WWW) server or server clustering environment that stores data in the form of web pages and transmits these pages as Hypertext Markup Language (HTML) files over the Internet 110 to the client computers. For this embodiment, the client computers typically run a web browser program to access the web pages served by server computer 116 and any available content provider or supplemental server, such as computers 106 and 112.

As shown in FIG. 1A, any of the processes executed on any of the client and/or server computers may also be referred to as modules or components, and may be standalone programs executed locally on the respective client computer, or they can be portions of a distributed client application run on the client or a network of client computers. Thus, the integrated physical security management process 112 may represent one or more executable programs modules that are stored within network server 104 and executed locally within the server. Alternatively, process 112 may be stored on a remote storage or processing device coupled to server 104 or network 110 and accessed by server 104 to be locally executed. In a further alternative embodiment, the integrated physical security management process 118 may be implemented in a plurality of different program modules, each of which may be executed by two or more distributed server computers coupled to each other, or to network 110 separately. Throughout the description, the terms, "module," "component," and "process" may be used interchangeably to mean an computer program, routine, or subroutine that is executed on any of the server and/or client computers of FIG. 1A, and may be implemented as software, firmware, or programmed hardware.

For an embodiment in which network 110 is the Internet, network server 116 executes a web server process to provide HTML objects, typically in the form of web pages, to client computers coupled to the network. To access the HTML files provided by server 116, the client computers execute web browser processes that accesses web pages available on server 116 and resources, such as supplemental server 106. The client computers may access the Internet 110 through an Internet Service Provider (ISP). Content for any of the programs or data associated with the physical security systems used by the client computer may be provided by a data store 120 closely or loosely coupled to any of the servers and/or each client computer. A separate content provider may provide some of the data that is provided to the integrated physical security management process 118. Although data store 120 is shown coupled to the network server 104, it should be noted that content data may be stored in one or more data stores coupled to any of the computers of the network, such as network client 102 or to devices within the network 110 itself.

Figure 1B:
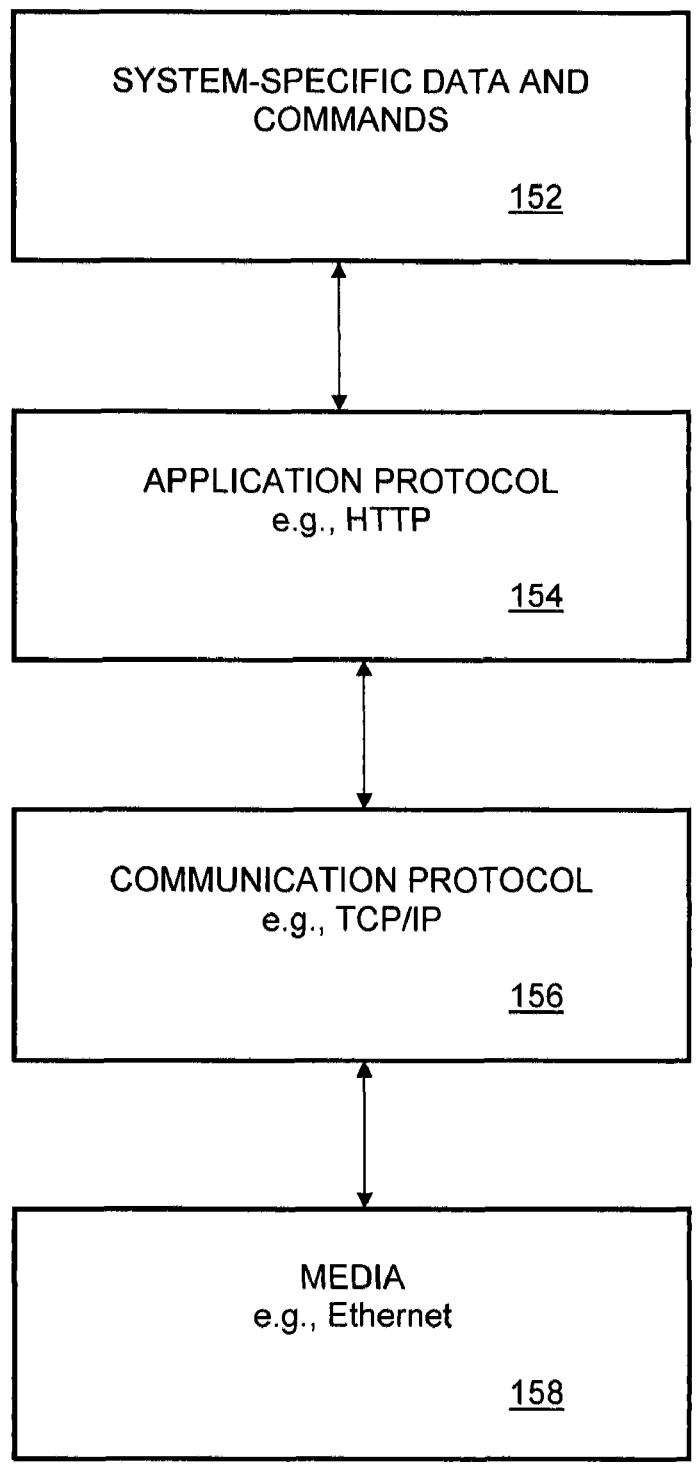
FIG. 1B illustrates an interconnection stack for integration of disparate physical security systems, under an embodiment.

The integrated physical security management process 118 interconnects and integrates with disparate physical security systems, normalizes the communication data, commands and events from these different systems into a common standard format. A management function provides a mode of visual representation of the normalized physical security systems, data and processes, and visual policy objects define the design time behavior for flexible and actionable rule creation. FIG. 1B illustrates an interconnection stack for integration of disparate physical security systems, under an embodiment. In general stack 150 represents layers in a network system that includes dedicated devices, software systems and applications that are responsible for internetworking, configuration, management and monitoring of computer networks. These systems perform various functions as defined by the Open Systems Interconnection (OSI) model of ISO (international Standards Organization) and ITU (International Telecommunication Union). Internetworking devices support different media interfaces and communication protocols and connect different computing systems as well as other peer devices to create a wide variety of local area networks (LAN) and wide area networks (WAN) such as the Internet. These devices include hubs, switches, bridges and routers that connect various segments of a network. These systems are based on standard protocols for network communication at the media (wire) level, including: LAN/Ethernet—defined by IEEE 802.3, Wireless LAN (WiFi)—defined by IEEE 802.11, ATM (Asynchronous Transfer Mode), TCP/IP (Transmission Control Protocol/Internet Protocol), UDP (User Datagram Protocol), ICMP (Internet Control Message Protocol), OSPF (Open Shortest Path First), RIP (Routing Information Protocol), and IPSec (IP Security). Network services systems include network equipment and applications that provide services used by end-users and/or other computing systems. Such application protocols for services include: VoIP (Voice over Internet Protocol), RoIP (Radio over Internet Protocol), HTTP (Hypertext Transfer Protocol), FTP (File Transfer Protocol), SMTP (Simple Mail Transfer Protocol), POP3 (Post Office Protocol version 3), DNS (Domains Name System), VPN (Virtual Private Networking) that is used to securely tunnel a corporation's network traffic through various networks.

Additionally, there are software applications that complement the network devices by providing functionality for configuring the network and also monitoring the network for alarms and performance. These systems are based on standard protocols for configuration and monitoring, these include: SNMP (Simple Network Management Protocol), CMIP (Computer Management Information Protocol), and OSS (Operations Support Systems). The process 118 takes system specific data and commands 152 and conforms them to the appropriate application protocol 154, communication protocol 156, and the media 158 layers.

The integrated physical security management process 118 includes multi-communication, media and application interfaces to connect with disparate, multi-vendor and distributed physical security systems as well as software applications and networking systems. An integration layer contains agents and adapters with built-in intelligence for multiple physical security systems and supports extensibility through mapping of application protocols, command and data 152 formats for integration with new and emerging physical security systems. It also normalizes the communication data, commands and events from the disparate physical security systems to a common standard format. This common representation can be used by applications, rules engines and other standard software components, while still maintaining communication to the respective physical security systems, applications and devices in their native, proprietary format. This eliminates the need for the customer to perform costly replacements in order to achieve rules bases integration and interoperability.

Figure 2:
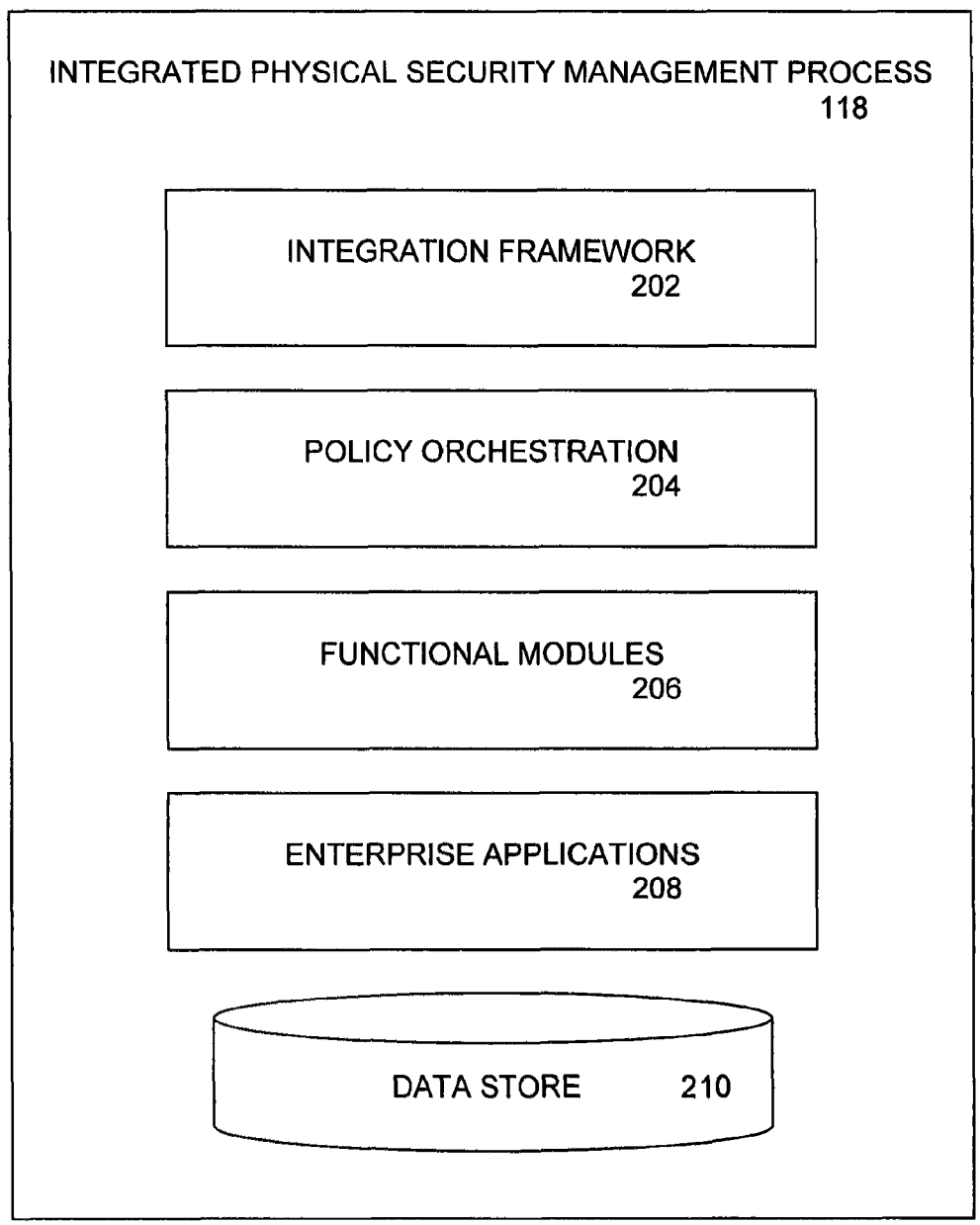
FIG. 2 is a block diagram that illustrates the major components of an integrated physical security management process, under an embodiment.

As stated above, in one embodiment, the integrated physical security management process 118 includes a number of constituent modules that normalize security system data, create policy rules, and process the data and events of physical security systems. FIG. 2 is a block diagram that illustrates the major components of an integrated physical security management process, under an embodiment. As shown in FIG. 2, integrated physical security management process 118 includes an integration framework component 202 that provides certain processes to interconnect physical security systems to an orchestration and policies module 204. The integration framework 202 supports different transport protocols and can be configured to interconnect disparate systems through standardized system and data mapping definitions. Once connected the systems receive and send data and events to each other normalized through policies that are based on the rules defined by the system. The policy orchestration component defines processes to describe the data and event mapping and transformations between physical security systems and data stored in a system data repository, as well as other network or IT systems.

The system policies are defined on normalized data and events using a visual policy editor. The system provides embeddable software objects and processes to enable drag and drop capability for policy creation on physical security and other systems connected through the integration framework 202. In one embodiment, system policies are described in standard XML (Extensible Markup Language) that is loaded on the rules engine. At run time the rules engine enforces the rules on the access control data and events passing to and from the systems connected through the integration framework 202. The rules engine controls the persistence and distribution of physical access changes as well as correlates security events to create actionable alarms and alerts for management applications, supervisory staff or physical security, network or IT systems. The defined policies can, furthermore, connect to systems of record for data verification and rules enforcement in real-time. For example, corporate directory services, such as provided by data store 108, can be used to verify the authenticity of a person, requesting access to a building through a physical security system.

The integrated physical security management process 118 includes one or more functional modules 206. These functional modules are web-based modules that utilize the services provided by the underlying core functionality of integration and policies, primarily to configure and view integrations between systems, visually create and edit policies enforced by the system, report and edit personnel data, view alarms, and alerts and policy actions through configurable reports, among other similar functions. Process 118 also includes one or more enterprise applications 208 serving various business functions. These can be flexibly built using the functional modules 206 by adequately trained software professionals managing physical, network and IT security software applications. A data repository or data store 210 provides the normalized definitions (schema), audit trail and persistence of data and events from across multiple, disparate security, network and IT systems. The data store maintains a record of all changes received and propagated, and in one embodiment utilizes industry standard data warehousing technologies.

Figure 3:
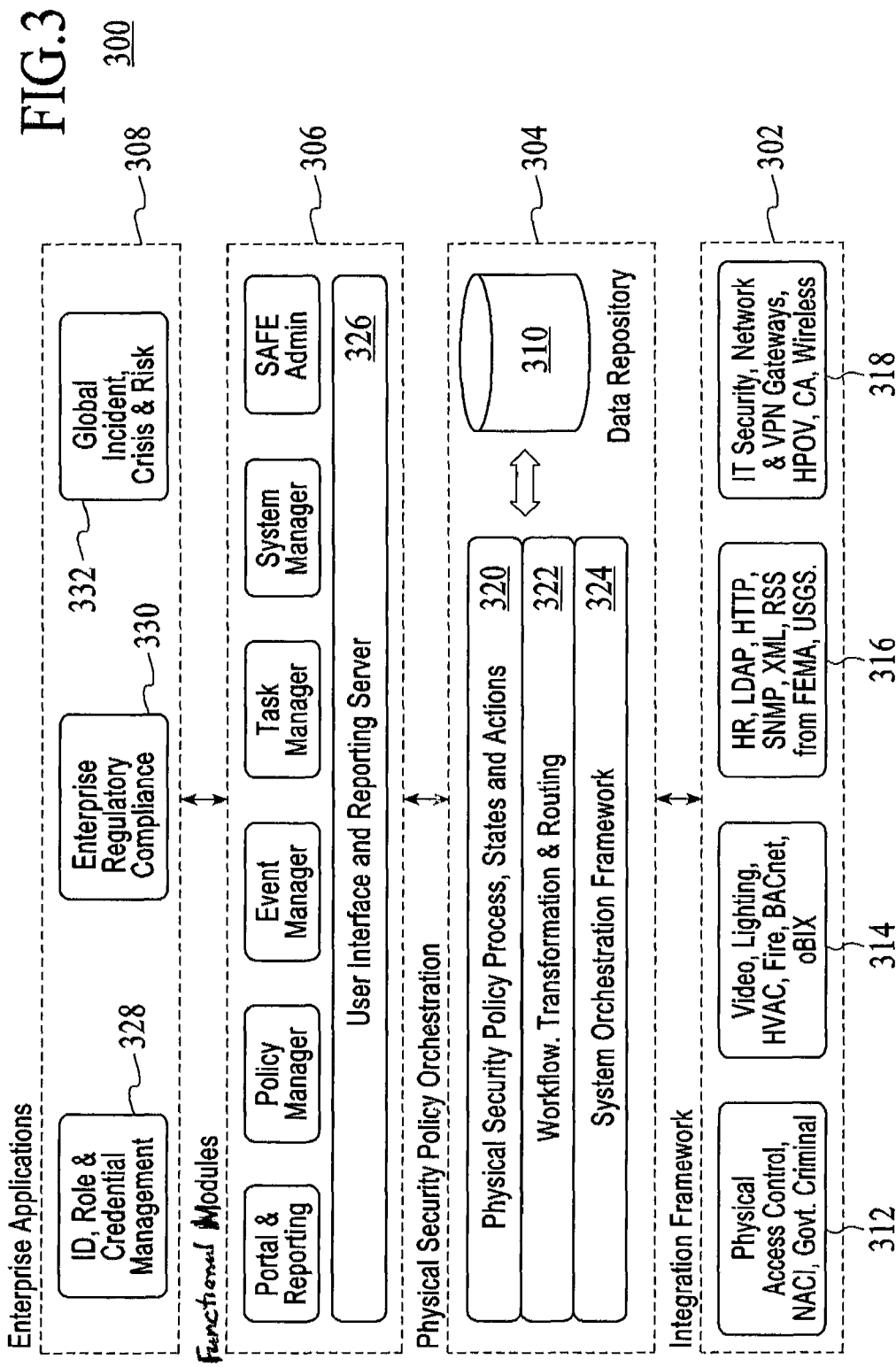
FIG. 3 illustrates the sub-components of the integrated physical security management process of FIG. 2, under an embodiment.

FIG. 3 illustrates the sub-components of the integrated physical security management process of FIG. 2, under an embodiment. As shown in FIG. 3, the integration framework component 302 includes several sub-components that are responsible for receiving the physical security systems data and events in multi-protocol, multi-vendor format. This data is then normalized and standardized to build and maintain state information based on system-defined policies and rules. The different data protocols handled by the integration framework 302 can include governmental physical access control protocols 312, such as NACI (National Agency Check with Written Inquiries), and other similar personnel verification protocols; physical plant controls 314, such as lighting, video, fire, HVAC (heating/ventilation/air conditioning), building automation and control networks (BACnet) and similar protocols. Other subcomponents of the integration framework include human resource directory information, which can be provided in any number of different formats, such as LDAP (lightweight directory access protocol), SNMP (simple network management protocol), and web-based protocols such as XML (extensible markup language) and RSS (really simple syndication), among other data formats. The HR data can be provided by a separate server computer, such as server 106 in FIG. 1A. As also shown in FIG. 1A, certain IT information can be provided by server 112. Thus, integration framework 302 includes a subcomponent 318 to handle data that could comprise information related to IT security, network or VPN (virtual private network) gateways, open view or wireless protocols.

The physical security policy orchestration component 304 examines and processes all physical security data and events in order to apply the configured rules. The rules determine the action to be taken and eventually the state that should be maintained for all physical security access and events. In one embodiment, this subcomponent includes a system orchestration framework 324 that defines and maintains the matrix of interconnectivity between disparate systems and proprietary data formats; a workflow, transformation and routing module 322 that defines and maintains the transformational mapping of data and events between the different connected systems, and also controls the flow of data between systems through rules based routing as defined by certain physical security policy process, states and actions 320. The rules-based routing can also include additional workflow utilizing internal or external systems and processes, thus affecting the destination of the data changes, events and actions received, propagated or generated by the system. The physical security policy process, states and actions module 320 receives the rules XML definitions from a visual policy manager and applies these definitions to the data and event flow occurring through the system. This module is also responsible for maintaining all physical security states (such as access permissions, alerts status and actual physical status of individuals in security systems). This state information is correlated to data changes and events processed through it and used to create actionable data changes and events affecting the state of relevant physical security, network and IT systems. A data repository 310 stores all of the relevant data, as well as policies and rules defined by the system.

The functional modules 306 within the integrated physical security management process include a user interface and reporting server 326, which is a standard user interface and reporting functions to provide users with access to the data, events and functional modules provided by the process to manage, monitor and control physical security through rules-based policies. Other functional modules include software for performing the requisite functions of physical security access management, policy creation and enforcement, compliance tracking, task and workflow assignments, system management and administration.

The enterprise applications subcomponent 308 includes physical security management applications that can be provided to users based on the multiple security systems, policies and events. These include personnel or user identification, role and credential management applications 328, enterprise regulatory compliance 330, and global incident crisis and risk applications 332.

Figure 4:
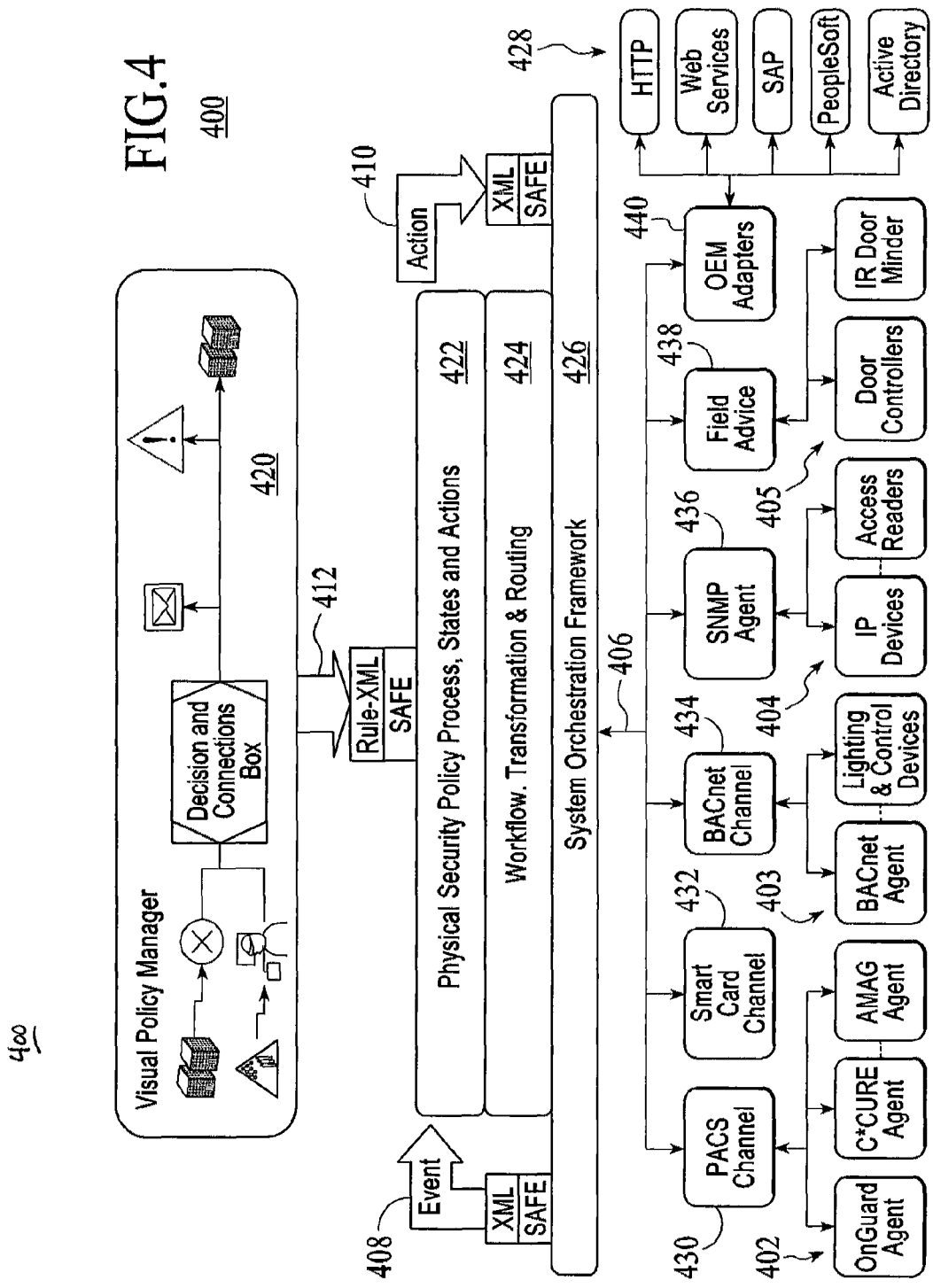
FIG. 4 is a flow diagram that illustrates the processing of data and generation of processing rules in an integrated physical security management process, under an embodiment.

FIG. 4 is a flow diagram that illustrates the processing of data and generation of processing rules in an integrated physical security management process, under an embodiment. As shown in system 400, the system orchestration framework layer 426 integrates and routes data from disparate and distributed physical security systems to a workflow component 424. The data and events are received in the native format of the individual systems, such as lighting/control devices, access readers, door controllers, infrared sensors, card readers, and personnel control agents (e.g., BACnet, OnGuard, C*Cure, AMAG, etc.). Basic sensor or agent data is transmitted over lines 402-405 to system channels or agents, such as PACS channel 430, smart card channel 432, BACnet channel 434, SNMP agent 436, and field advice agent 438. Various web-based or proprietary HR resource protocols 428 can be handled by an OEM (original equipment manufacturer) adapter 440. All of the disparate data is routed 406 to the integration layer of the system orchestration framework 426, which is configurable to support the multiple physical media, network protocol and data formats that can be used to integrate with various systems. Additionally, data changes and events can also be received from networking systems and IT applications.

In one embodiment, the data and events received from various systems are aggregated in step 406 in accordance with defined data mapping and translation schemes. This normalizes the data and events into standardized format that enables processing by the policies and persistence in the data repository. Similarly, physical security events, actions and data generated or propagated through SAFE to various physical, network and IT security systems is normalized and standardized to formats recognized by the respective systems.

As shown in FIG. 4, physical security policies are defined in a visual policy manager 420 using actionable representations of physical, network and IT systems as defined and configured in the system. Users, such as security administrators, define the data and event flow through the various physical security systems, rules that are run on it and the actionable events that are created from a policy engine as a result of rules execution. The rules thus defined are converted in step 412 into standardized rules definitions based on XML format. These rule files are supplied to the physical security policy process, states and actions module 422. This module 422 stores the rules and applies them to every data or alarm event that is propagated through it creating actions that determine persistence, propagation or alarm events such as storing the data in the data repository 310, creating a workflow for task assignment or verification, generating alarms or events for external systems (e.g., e-mail or pager notifications, or SNMP for network management systems), or assignment/revocation of requisite access privileges and propagating the change to relevant security systems.

As shown in FIG. 4, the system orchestration framework layer 426 passes the normalized events and data from the various devices up through an event report 408 to the physical security policy process, states and actions module 422. In this manner, the physical security related data (for example, personnel credentials and access privileges) and events (for example, alerts) from physical security systems, network and IT applications are sent to the system for processing. The workflow module 424 then applied relevant transformation and routing rules to the events and data to generate action events 410 (for example, alerts, emails or SNMP alarms) on the physical security related actionable data (for example, personnel credentials and access privileges).

In one embodiment, the integrated physical security management process provides a normalized physical security integration environment in which rules can be created to uniformly address the following main types of entities: physical security systems and devices (e.g., PACS and sensors), data (e.g., users, access, events, commands), and processes (automated cross-checks, schedules, reference lookups, approvals, and notifications). Visual rule building-block objects are created in a data model to represent the normalized physical security systems/devices, data and processes. The representation of the systems and data includes the data mapping, formatting, hierarchical (and other) relationships and the commands specific to the individual types of systems. This includes not only the physical security systems but other source applications as well as consumers of the data, events and commands that can be either received or generated from the system. The representation of the processes includes mapping and attributes to support the ability to design security operations related workflows which can include cross-checks, references and interaction with users, applications and other systems. The visual rule objects contain attributes that define their spatial relationship to other building blocks that are used to represent normalized systems, data and processes. Such building blocks are also referred to as stencil shapes or live objects." The rule objects represent normalized systems, data and events and reference back to the data repository, even during design time to provide data lookups and references related to the rule relationship being created. Thus each object exposes rule attributes and allows the user to define values during design time that are to be used during rule execution. A rule object's attribute values can be a) specific (entered manually or looked-up from real values during design time) b) wildcards or c) implicit (obtained from the lookup of an external system during rule execution time or from the incoming data). For example, if the rule shows person credentials being received from a Corp HR Directory (e.g. using LDAP protocol) and the person's role being checked to provision into a Lenel type of physical access control system—then, the user who is designing the rule would only see Person attributes AND possible values related to the normalized representation of the HR system thus creating a convenient, effective system of rule creation. This is done through real-time communication of the design time front end visual editor to the backend data repository, normalized system and rules definitions. As the rule is created using a visual policy editor using drag and drop graphical user interface techniques, interconnection of rule objects and setting their properties the user is guided through the creation as well as the rule design validated in real-time before finally being saved and pushed to the rules engine for execution.

The rules engine is a software module that applies the defined rules on the data transactions processed by the system. A policy is a user-defined logical entity that acts as a container for rules that are contained in the policy definition. An administrator typically creates a policy and then adds rules to the policy. Multiple policies can be created in the system. Policies are logical entities that allow easy grouping of rules in order to understand, view, enable and order them as one group. Rules are the actual lowest level combination of Condition-Action that is applied to the data objects processed by the system. The policy manager applies one rule at a time to the data passing through the system.

Figure 5:
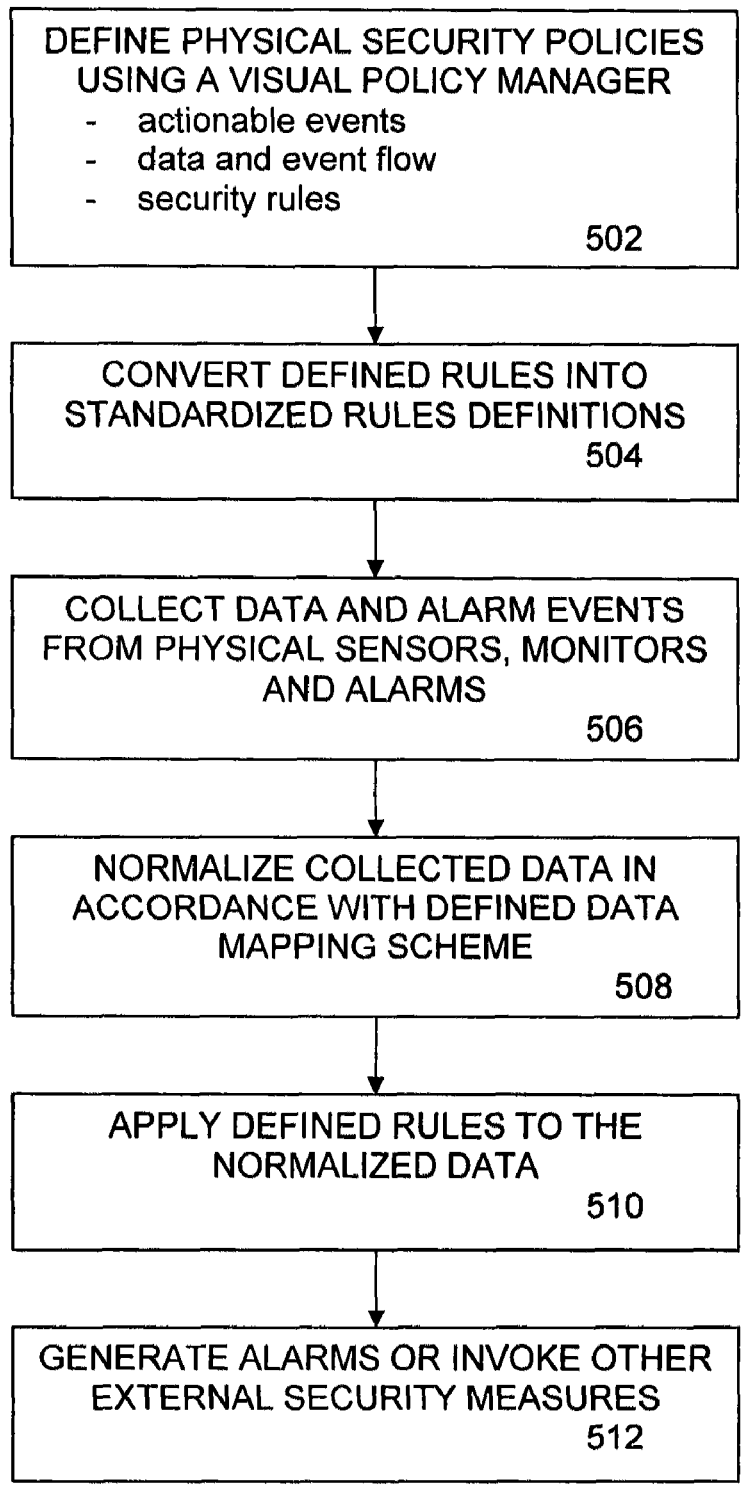
FIG. 5 is a flowchart that illustrates a method of creating rules and processing source security data in an integrated physical security management process, under an embodiment.

FIG. 5 is a flowchart that illustrates a method of creating rules and processing source security data in an integrated physical security management process, under an embodiment. Physical security policies are first defined using a visual policy manager, block 502. In one embodiment, this is a GUI (graphical user interface) driven process that allows a user to define event objects representing actionable events, data objects representing personnel and/or assets, and rules controlling the interactions among the events and the objects. The defined rules are then converted into standardized rules definitions based on a standardized format, such as XML, block 504. The system collects data and alarm events from physical sensors, monitors and/or alarms distributed throughout the monitored facilities, such as facilities 102 and 103 in FIG. 1A, block 506. This data is collected in native format and then aggregated and normalized in accordance with defined data mapping and translation schemes, block 508. This formats the data and events into a format to enable processing by the defined rules. These defined rules are then applied to the normalized alarm and event data, block 510. The rules can cause any number of internal or external actions to be taken, block 512. Although embodiments are directed to the use of XML, it should be noted that other standards are also possible, such as ODBC (Open Database Connectivity) JDBC (a Java application programming database), RDBC (relational database management system), and schema, among others.

The external responses of block 512 can be configured depending on the requirements and constraints of each monitored facility. These include the generation of audible alarms, notification of authorities (e.g., fire, police, medical), notification of company personnel (e.g., security officers, corporate officers, IT managers). In the case of physical intrusion, the system can be configured to physical shutdown areas of the facility or implement any type of lockdown mode to prevent further access or escape from any intruder. In the case of an IT intrusion event, the system can be configured to shutdown computer resources to prevent access, and in the event of a physical catastrophe, such as fire or earthquake the system can be configured to initiate automatic computer backup procedures or open fire escape doors and provide illumination, and so on.

Figure 6:
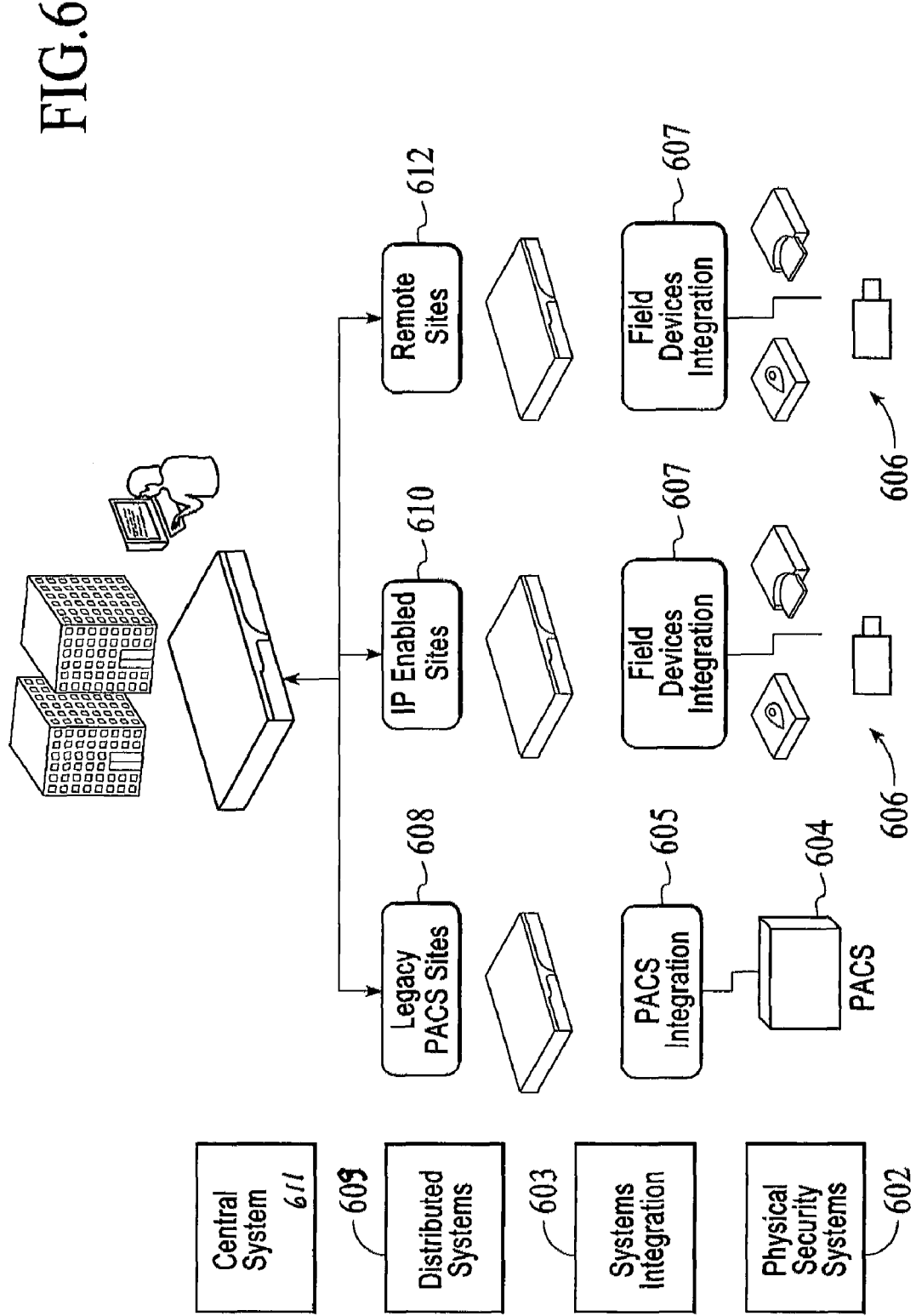
FIG. 6 illustrates an example of a distributed deployment an integrated physical security management process, under an embodiment.

FIG. 6 illustrates an example of a distributed deployment an integrated physical security management process, under an embodiment. System 600 illustrates the integration of various physical security systems through rules-based policies defined by the physical security management process. Physical security systems 602 include various legacy physical access control systems (PACS) 604 that are integrated through an integration process 605 that maps the legacy, proprietary data to standardized formats to be acted upon by the policy manager and for centralized viewing and editing. These systems in turn could be managing or controlling access on various underlying physical control systems and devices. Such systems include physical access control and surveillance devices that can include, but are not limited to, access card readers, biometric sensors, door controllers and video cameras, shown collectively as field devices 606. In general, field devices could support and be integrated through industry standard IP or other communication protocols through a field device integration process 607. Data formats are translated and mapped appropriately by the integration module for use by policies and applications. Such field devices are typically deployed in IP enabled sites 610. Alternatively, field devices can be deployed in a remote distributed environment, 612, such as a remotely located wirelessly connected warehouse building.

As shown in FIG. 6, a systems integration component 603 is illustrated in a distributed mode to integrate data, events and actions from multiple physical security systems and devices spread over geographical regions for field devices 607.

In one embodiment, the physical security management process can be distributed and modularized in distributed systems 609 to perform specific limited functions related to the integration and management of physical security systems of one particular physical site, geographic region, and so on. Rules-based definitions are configured and managed in real-time by the system integrators and administrators define the nature of the distributed functionality, propagation of control commands and functions, and for data and events to be handled locally (at remote location) versus centrally through centralized systems.

A central system 611 is provided as the master repository for all control and management information, as well as for data. Users typically log in to a user interface to view the data flows, view and edit access information across security systems, create policies that affect the behavior of underlying security systems and cause generation of actions and events. Multiple hierarchies of distributed systems can similarly be created to selectively propagate data, events and actions through the deployment and assign particular functions to specific systems as well as define administrative access privileges to data, events and applications at every layer.

Managed Physical Security System Policy Manager

In one embodiment, the integrated physical security management process is included within an overall managed physical security system (MPSS). A policy manager within the MPSS provides administrators and users the ability to define policies and real time oversight mechanisms to ensure corporate (or other entity) policy compliance and monitoring across distributed physical and IT security systems.

A policy is a user-defined logical entity that acts as a container for rules that are contained in the policy definition. The user typically creates a policy and then adds rules to the policy. Multiple policies can be created in the system to fulfil objectives that are necessary for successful management of distributed enterprise physical security systems. These include: an oversight mechanism over data changes occurring throughout the physical security infrastructure, enforcement of corporate policies by defining system policies that mirror corporate security guidelines; monitoring compliance through tracking of violations, generating alarms on violations; and performing task assignment for security/administration personnel to resolve possible policy violations.

All data flow in the integrated physical security management process is controlled by policies, which are managed and processed by the policy manager. Policies can be categorized into several different types. The first type are system policies, which define the general flow of data between the managed systems and represent the set of rules that are applied to data objects for system level replication. For example, a system policy is the set of rules that determine if a system, Chicago-1, can accept data from another system, Dallas-2. System policies are always defined from the context of the receiving system, i.e., the system indicates whether it would be willing to accept a change on data made by some other system. System policies are defined generally at the time a system is added by defining the orchestration for it. Policies that recognize the attribute level differences between systems and determine how to propagate data are a special case of system policies. An example of this is the clearances attached to a person object by means of a user profile. If a person object is being propagated to a system that does not support all the clearances attached to the object then the policy manager will 'strip' the additional clearances before propagating the changed object to the MPSS.

A second type of policy is a user policy. User policies are similar to system policies, but are more granular and apply to the attributes within the data object. The conditions for rule execution are based on object attributes. For example, a rule can be defined that prevents a change to the Social Security Number by any system other than a headquarter HR system to be propagated across to other systems. This rule execution would result in the person data object being dropped, and also to cause such an event to raise an alarm in the system. One distinction between system and user policies lies in the fact that user policies are configurable by users in order to block propagation, detect policy violations and raise alarms.

Policies are logical entities that allow easy grouping of rules in order to understand, view, enable and order them as one group. Rules are the actual and lowest level combination of Condition-Action sequences that are applied to the data objects passing through the process. The policy manager applies one rule at a time to the data passing through the system. In general, a policy can comprise one or many rules; the rules are applied on data in sequential order—starting from top to bottom; the order of execution of rules can be changed; a rule inside a policy can be enabled or disabled to allow a user to define rules but not enable them for processing until a later time.

Rules are logically composed of separate components that facilitate the creation of complex expressions that are processed internally by the policy manager. A source to destination pre-condition component defines the precondition for data changes propagating initiated by one physical security system to other security systems, and helps define a system specific context to the rule. A condition component provides a mechanism by which the rule is evaluated to determine if the defined action should be performed or not. The conditions are defined as logical expressions that are defined using the data objects that can be used as condition objects. For example, in the logical expression "UserID='jdoe'" is a condition that can be defined using an expression operator '=' and two objects UserID (predefined) and "jdoe" (user input string). An action component defines the action that the policy manager should perform when a rule condition is met.

For policies to serve their purpose, they must be applied at the right point in the lifecycle of the data flowing through the system. The key data points through which messages and events flow are as follows: (1) a data change in the MPSS is detected by the agents in the integration layer 603; (2) a request for the change is generated by the agent for the channel that aggregates communication from the integration layer components; (3) a channel propagates the change to the adapter which is responsible for persisting the changes and broadcasting it to other modules, as well as external systems; and (4) requests are created for other MPSS and other applications interested in receiving the changed object. Policies are generally applied when a data object is received at the agent 'edge' of the SAFE system—be it destined for a MPSS (a change being propagated from SAFE to other MPSS) or the system itself. For data objects being propagated to other MPSS, only a change that has initially being received from a MPSS and subsequently written successfully can be a candidate for further propagation to other MPSS. For the policy definitions that define rules using the source system information as a condition, to work correctly the original source system information must be maintained in the data object request when propagating that change from SAFE.

Rules are written and read from left to write, and this also represents the flow of the data message. The shapes on a diagram successively apply the conditions and actions as the message 'flows' through. Some shapes can be placed multiple times—like parallel actions. Others are restricted to one instance or other interconnection restriction. All shape behaviors and properties are defined when the shape is created. A number of basic types of shapes are utilized by the system: object shapes, condition shapes, actions shapes, modification shapes, references, and connectors.

Figure 7:
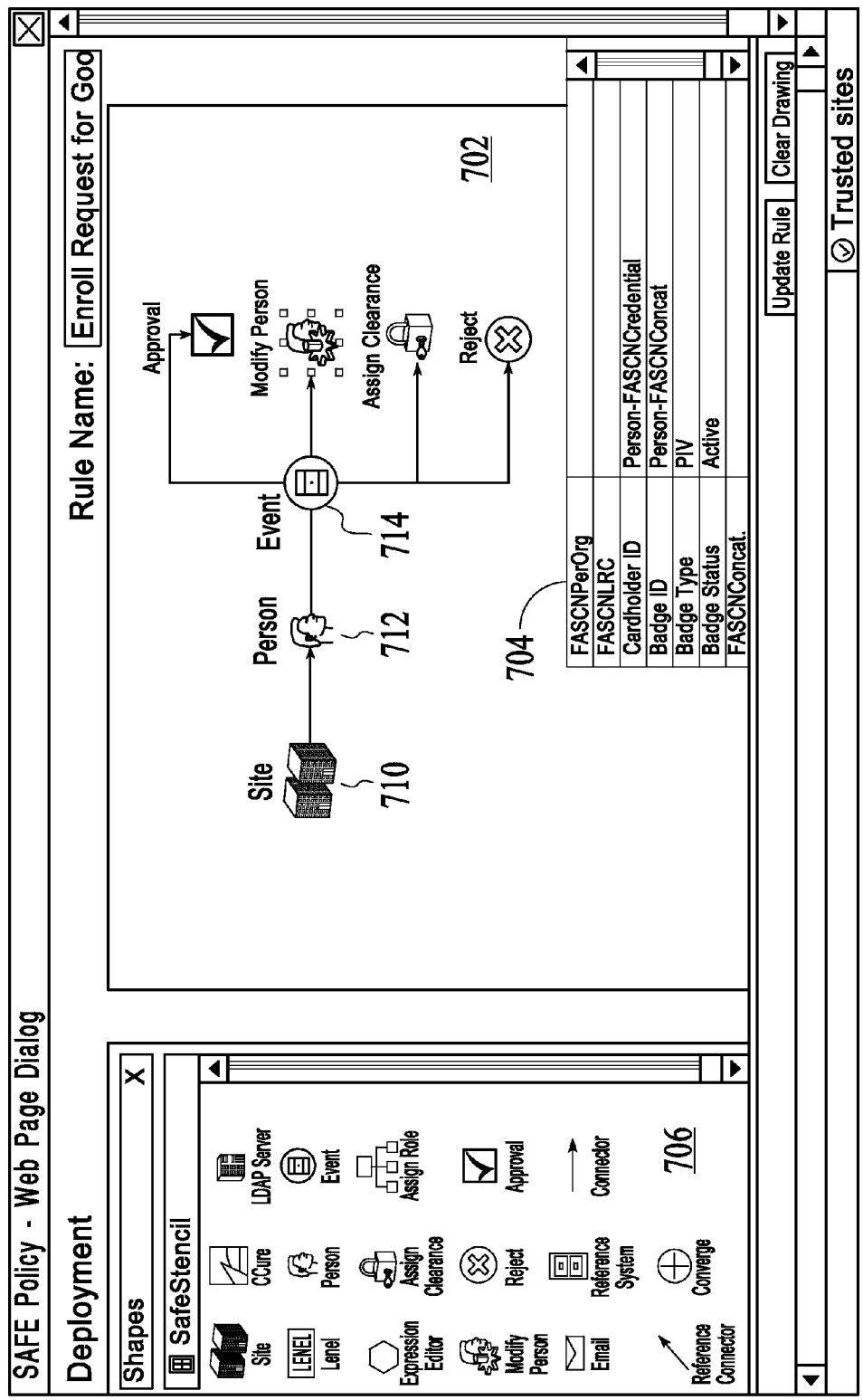
FIG. 7 is an illustrative web page of a visual policy editor for creating rules representing Managed Physical Security Systems and related processes, under an embodiment.

Object shapes represent entities or actors in the system. Example shapes, as shown in FIG. 7 include a graphic of a building for a site, a graphic of a person for an actor or personnel within the system, and a standard flowchart decision diamond for a decision. Condition shapes are used to create conditional expressions in rules. These can include selecting changes coming from a particular application, physical access control system, data source or self service system, selecting personnel data changes based on the values of the attributes in the personnel schema relevant to the source system, and defining more complex expressions in a decision box. Action Shapes that are used to create resultant actions in rules based on the preceding conditions, such as: raising an alarm condition, sending e-mail notifications, creating and assigning approval workflows, and rejecting (or blocking) changes from getting persisted to the MPSS. Modification shapes are used to create modifiers of the incoming data based on the preceding conditions. These include: mapping personnel attributes in a particular way to match the MPSS capabilities or modifying access badges, activation and deactivation dates etc., assigning or removing personnel's access privileges or clearances to physical locations or assets, and assigning or removing role-based access privileges. Reference shapes are used to create references for lookups and comparisons by the rules engine in real-time while processing the incoming data based on the preceding conditions. These include looking up additional information on provisioned personnel in LDAP, Active Directory, ODBC, and JDBC data repositories. Information lookup can be for the purpose of getting additional attributes, validating personnel credentials or for cross checking the results of other processes, such as training, compliance and background checks, and so on. Connectors are directional lines terminating in an arrowhead. These represent the flow of the rule conditions, actions and also data. The placement of connectors determines the precedence of operations and also defines Boolean expressions in conditions. Connectors can be sequential connections with one condition shape connected to another for an AND condition, or parallel connections with one condition shape in parallel with another for an OR condition.

Figure 12:
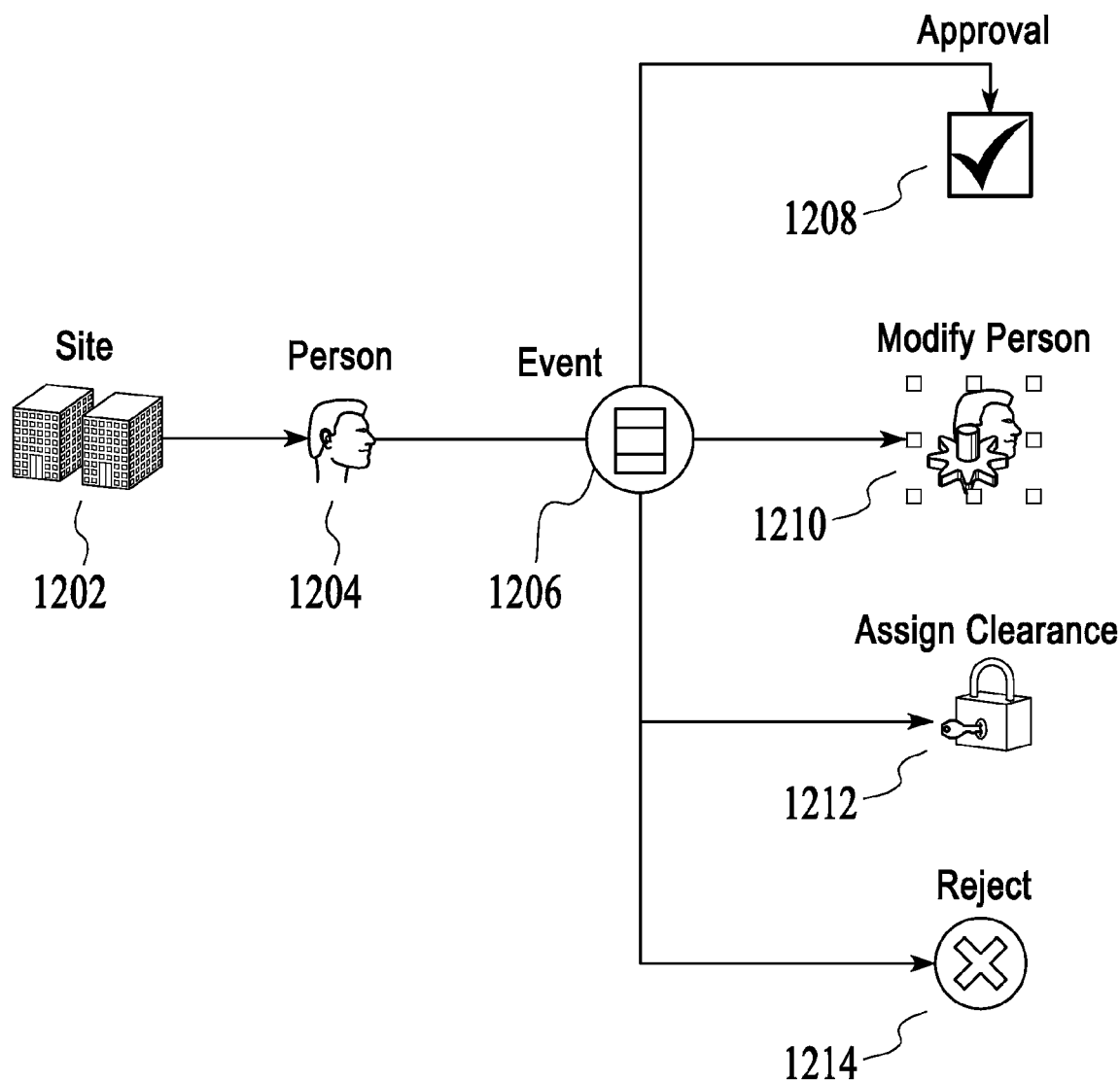
FIG. 12 illustrates an example rule that can is created by a policy manager, under an embodiment.

FIG. 7 includes an illustrative rule, which is shown in greater detail in FIG. 12. The rule can be read as follows: IF a data change comes from Site (filtered by attributes for Site object) e.g. corporate LDAP server, AND IF the data type is Person (filtered by attributes defined for Person object schema for this site, e.g. Person-Employee-Type=Contractor), AND IF Event type matches (the condition defined in the Event shape attributes), THEN Send Data Change Request for Approval. Approval shape includes attributes that define the approvers, status of request and the level of approvals it has to go through before final commit to the system, Modify Person Data Change Request (e.g., to change the physical access badge type to Contractor), Assign default access levels or clearances (e.g., Corp. HQ Lobby Access), and Do not allow the change to be persisted yet since it is pending approval.

Multiple such rules can be created to define a ladder of rules that are applied to every change message that is processed by the orchestration and rules engine. Precedence of rules can be altered by changing the rule order and thus the order of execution of the rule by the rules engine. Similarly, rules can be enabled or disabled.

Rule expression operators are used for defining and evaluating comparative expressions involving the condition objects, which are predefined in the system to be used in the web UI and policy manager. Examples of simple operators are:

1. EQUAL TO
2. NOT EQUAL TO
3. LESS THAN
4. GREATER THAN
5. CONTAINS
6. STARTS WITH

In one embodiment, Boolean operators such as AND, OR, NOT etc. can also be provided as rule expression operators. Alternatively, Boolean operations can be achieved either by defining individual multiple rules for execution or defining multiple actions for the same rule.

Every rule has an action associated with it. A rule can have multiple actions defined for it that are performed when the condition specified in the rule matches it. All actions are performed exclusively and do not depend on the other actions defined for that rule. Action objects typically act as forwarders of the event/object to the receiving module, for example and Alarm Manager/Conflict Manager allows the user to view and correct the problem indicated by a policy condition. Rule action objects are predefined objects in that provide the definition and logic for the actions that can be selected for a particular rule action. The action objects possible for the rules, in general, are:

1. Stop rule execution—do not process further rules in the policy for that object
2. Increment 'Counter'—remember occurrence
3. Send to alarm manager—raise alarm
4. Send to conflict manager—change pending in case of data modification
5. Tag as policy compliance violation.
6. Do not propagate/write to database.

In general, policies are applied at the following data points in the system through which messages and events flow are as follows:

1. Data change in the MPSS is detected by the agent
2. Request for the change is generated by the agent for the channel
3. Channel propagates the change to an adapter
4. Adapter receives and writes the change to the database
5. Requests are created for other MPSS interested in receiving the changed object Visual Policy Editor Visual rule building-block objects are created in the data model to represent the normalized physical security systems/devices, data and processes. Representation of the systems and data includes the data mapping, formatting, hierarchical (and other) relationships and the commands specific to the individual types of systems. A stencil is the container/repository of these objects that are used in the policy manager for creating actionable rules for integration of physical security systems, data and processes.

In one embodiment, the system rules are created visually through the use of a stencil of object shapes that represent physical systems, data flow and processes. A web-based interactive visual editor, such as Microsoft Visio Drawing Control can be used. Such a program should have a stencil of shapes representing physical security systems, data objects, workflows, processes, identities, events, and users. Each stencil object is data-driven, which means that it is based on data definitions in the database. This allows for extensibility as well as easy addition of new objects in the stencil to represent new security systems, processes etc. A rule is created by dragging and dropping drawing objects on to the map and interconnecting them to create rules. The policy control component monitors user events and communicates with the server 116 over the network in order to obtain data necessary for defining the rules in real-time. The user is provided a real-time design view of the rule being constructed. Object properties can be changed to construct the rules by selecting the options provided in the property editor of the connected objects. Options and data available to the user, while constructing rules, is based on the properties of the objects and data available in the system.

FIG. 7 is an illustrative web page of a visual policy editor for creating rules representing Managed Physical Security Systems and related processes, under an embodiment. The visual policy editor includes a stencil display area 706 that includes icons for several predefined objects, such as sites, servers, persons, events, connectors, and so on. A main display area 702 allows a user to visually define a rule by placing icons and connectors in appropriate relationships to one another. A descriptor area 704 allows for textual description of the objects within the rule. For the example shown in FIG. 7, the rule comprises an event 714 associated with a person 712 within a site 710. The event is associated with several object data items, such as assign clearance, approve, reject, or modify person.

Figure 8:
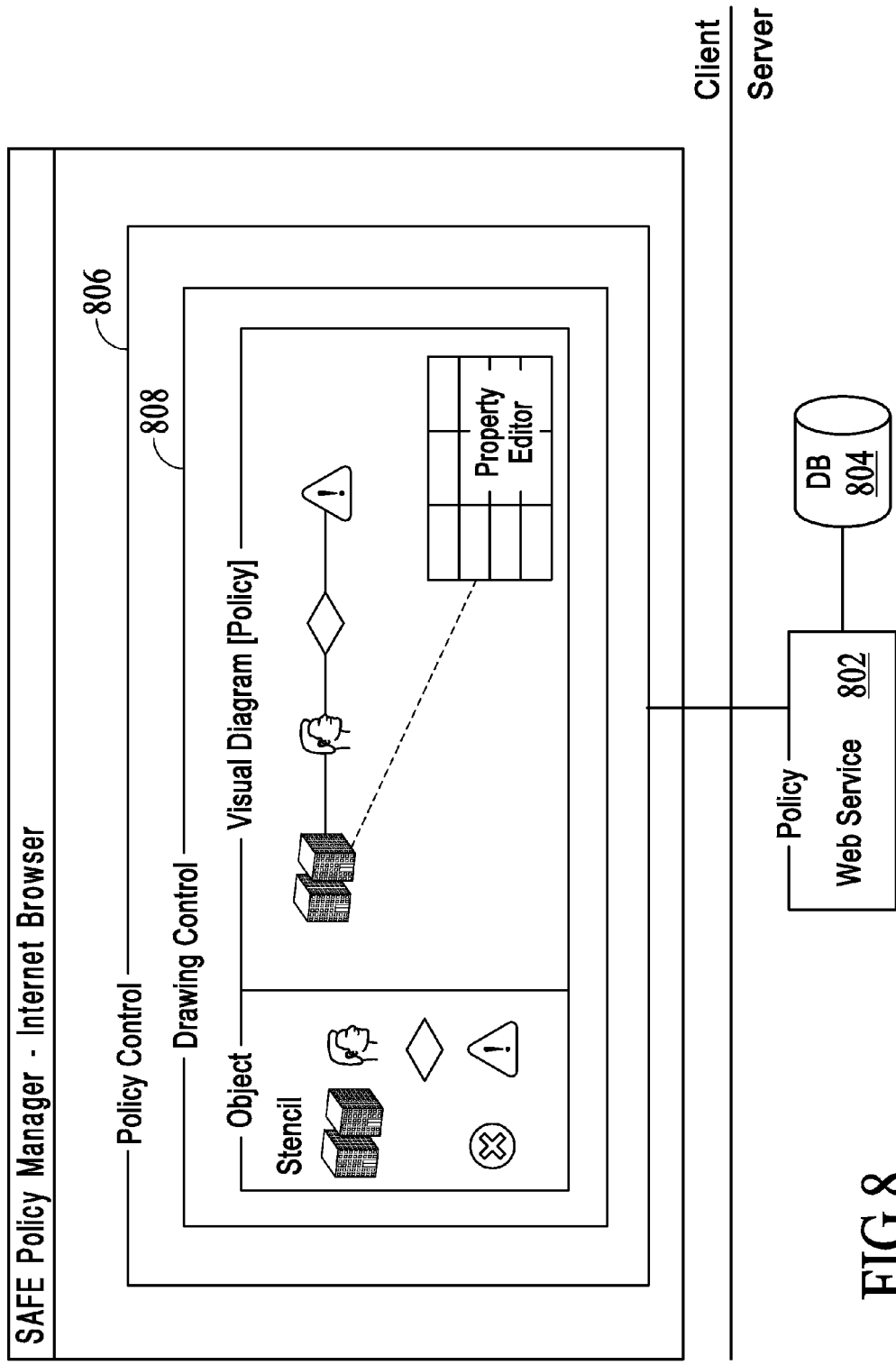
FIG. 8 illustrates a policy manager that uses an object stencil, under an embodiment.

FIG. 8 illustrates a policy manager that uses an object stencil, under an embodiment. The defined object data relationships and real-time web services communicate with the backend process to provide a real-time design view for users to create rules for physical security management. The rules are created within a drawing control panel 808 using the predefined stencil objects, on the client computer. The defined rules are then used by the web service process 802 and stored in a database 804 on a server computer.

Figure 9:
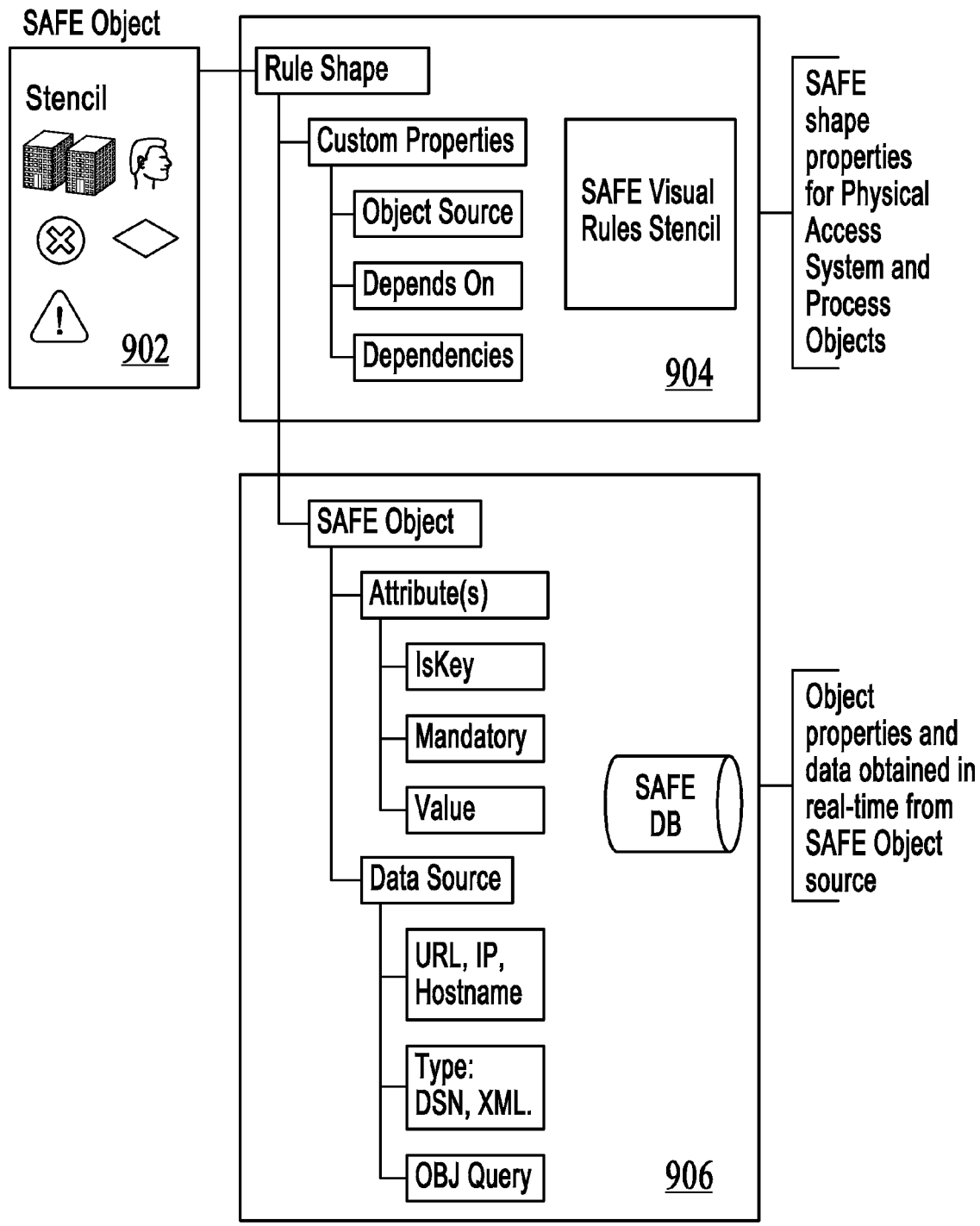
FIG. 9 illustrates a model for relationships of stencil objects to physical security objects and processes, under an embodiment.

FIG. 9 illustrates a model for relationships of stencil objects to physical security objects and processes, under an embodiment. Object stencils 902 are defined within the system and are used as components of the rules. A visual rules stencil 904 defines the shape and properties of these objects within the rule, as well as dependencies of the objects. A database 906 stores the object properties, such as any attributes, data sources, and the like. A schema is a data model that represents the relationships and a way to define the structure, content, and semantics of the data. The following is an exemplary extract from the definition schema of a particular rule object that would define its attributes, relationships and data sources:

```
<xs:annotation>
    <xs:documentation>The root container which contains the schema for
all objects</xs:documentation>
    </xs:annotation>
<xs:complexType>
    <xs:sequence>
    <xs:element name="ObjectSchema" maxOccurs="unbounded">
    <xs:complexType>
        <xs:sequence>
            <xs:element name="KeyFields" type="xs:string" />
            <xs:element name="MandatoryFields" type="xs:string" />
            <xs:element name="CategoryID" type="xs:string" />
        </xs:sequence>
        <xs:attribute name="ObjectType" type="xs:string" />
    </xs:complexType>
    </xs:element>
    </xs:sequence>
    <xs:attribute name="SAFESystemName" type="xs:string" />
    <xs:attribute name="VersionNumber" type="xs:string" />
    </xs:complexType>
```

Figure 10:
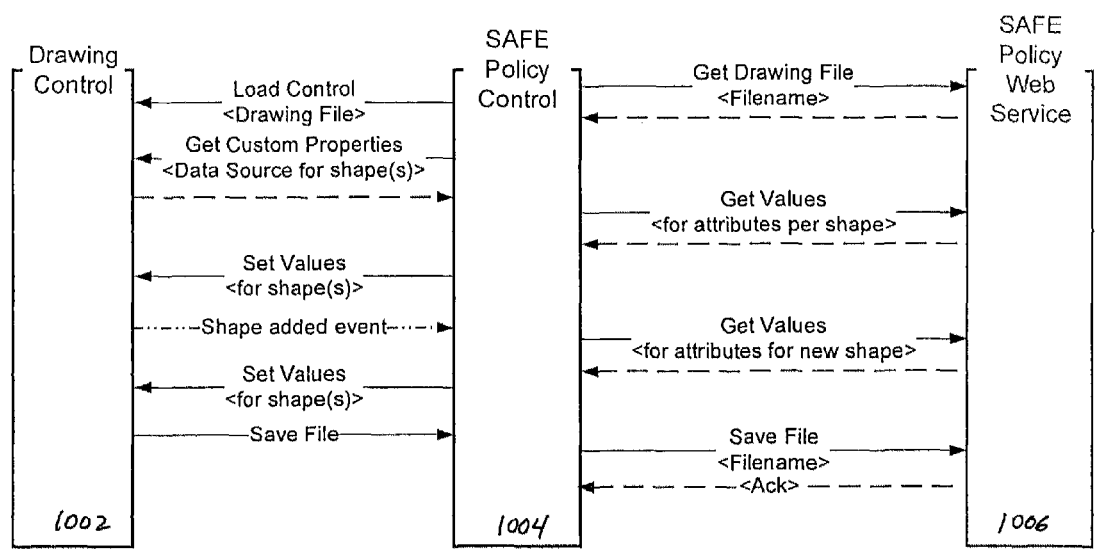
FIG. 10 illustrates interaction between drawing control and web services for the visual policy editor, under an embodiment.

FIG. 10 illustrates interaction between drawing control and web services for the visual policy editor, under an embodiment. The interaction between these two components provides a real-time design view for the policy manager using the stencil objects. As shown in FIG. 10, a policy control component 1004 gets drawing files and values from the service component 1006. The drawing control component 1002 then gets custom properties and sets values for the stencil objects within the rules.

Figure 11:
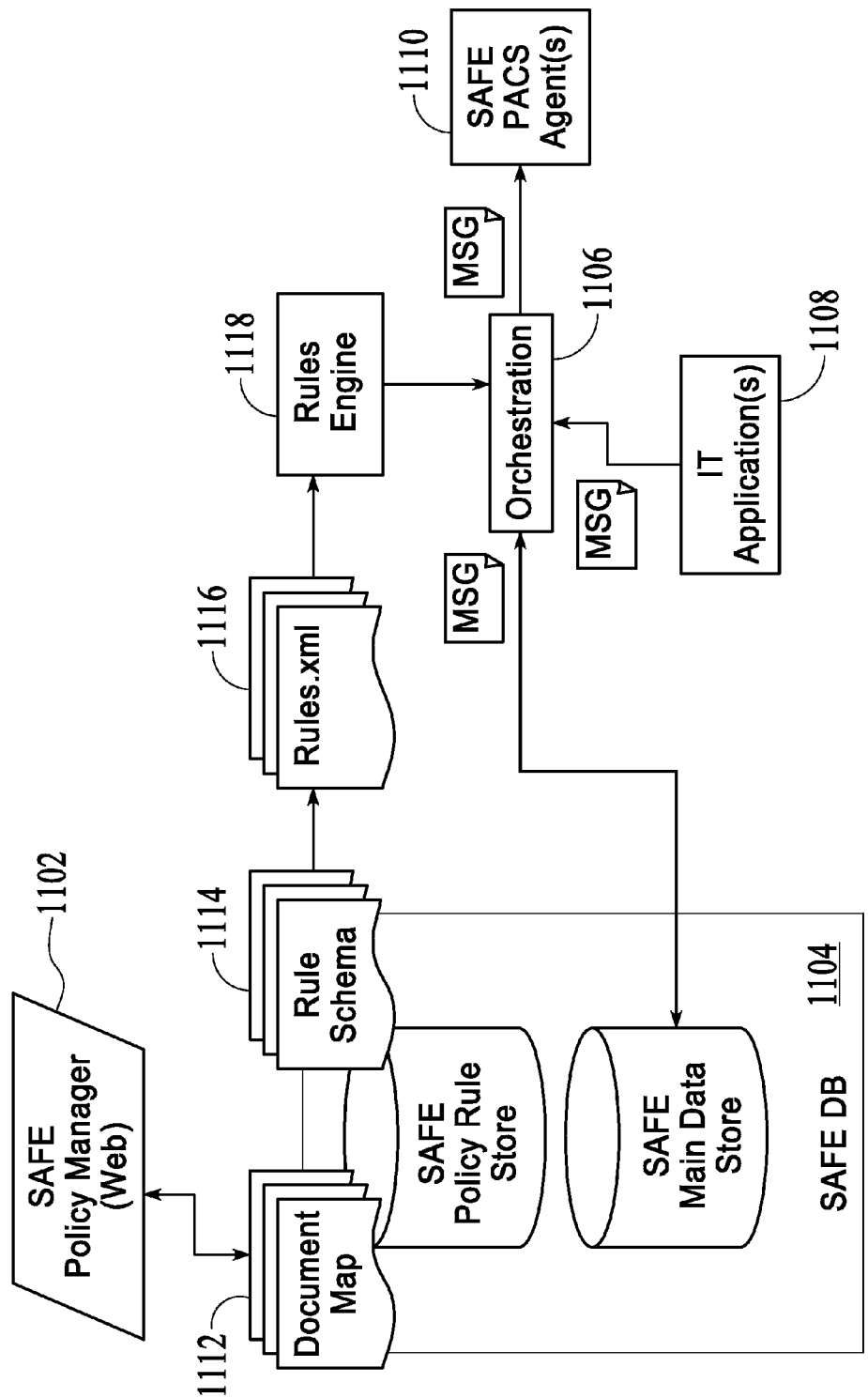
FIG. 11 is a flow diagram illustrating a process of saving a created rule in a database using a visual policy editor, under an embodiment.

FIG. 11 is a flow diagram illustrating a process of saving a created rule in a database using a visual policy editor, under an embodiment. A rule 1114 comprising stencil objects is first created using the visual policy editor, it is then saved in a database 1104, converted to rules XML, and pushed to a rules engine 1118 so that all messages flowing through the system orchestration 1106 are subject to rules defined by the policy manager 1102. These rules are then invoked whenever an IT application 1108 sends an appropriate message to the orchestration component 1106. The rules are also utilized by a PACS agent 1110.

Embodiments of the integrated physical security management process described herein provide a system to process data and events in real-time while enforcing rules and policies thus persisting, propagating physical security data and/or creating alarms and alerts, as well as a system and process to integrate data output and alerts from policies to internal or external physical, network or IT systems, and to create distributed, multi-tier physical security integration, rules processing and event generation system for flexible deployment in small to large corporate, government or public establishments.

Embodiments of the process directly integrate with physical security hardware in a distributed, multi-tier environment to provide a system, process and apparatus for multi vendor, multi technology physical system integration that is media and transport independent to receive data and events, create and enforce policies to affect the outcome of security data persistence, propagation and generation of alerts affecting other physical security, network and IT systems. In this way, processes and systems are provided to discover and define an organizations spatial hierarchy of its global physical security assets (doors, buildings, etc). The disclosed system also provides processes and systems to generate unique physical access credentials for exclusive mapping between an individual's profile (job, department, location, etc) and an organizations spatial hierarchy of its global physical security system deployments (doors, buildings, etc), and generates unique access credentials based on individual profiles and automatic assignment across multiple physical security systems overcoming certain hardware/software limitations of standard access control system/hardware.

Aspects of the integrated physical security system described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the physical security system and methods include: microcontrollers with memory (such as electronically erasable programmable read only memory (EEPROM)), embedded microprocessors, firmware, software, etc. Furthermore, aspects of the described methods may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that components of the systems and methods embodying the physical security system and methods disclosed herein may be described using computer aided design tools and/or expressed (or represented) as data and/or instructions embodied in various computer-readable media, in terms of their behavioral, functional, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, etc.). When received within a computer system via one or more computer-readable media, such data and/or instruction-based expressions of the above described systems and methods may be processed by a processing entity (e.g., one or more processors) within the computer system in conjunction with execution of one or more other computer programs.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the physical security system and methods is not intended to be exhaustive or to limit the systems and methods to the precise form disclosed. While specific embodiments of, and examples for, the methods are described herein for illustrative purposes, various equivalent modifications are possible within the scope of other systems and methods, as those skilled in the relevant art will recognize. The teachings of the physical security system and methods provided herein can be applied to other processing systems and methods, not only for the systems and methods described above.

The elements and acts of the various embodiments described above can be combined to provide further embodiments. These and other changes can be made to the described methods in light of the above detailed description.

What is claimed is:

1. A system comprising:
   a plurality of security sensors distributed throughout a plurality of sites, each sensor configured to generate a sensor signal in response to a defined event, wherein the sensor signal is provided in a native format proprietary to a manufacturer of the respective sensor;
   a central security management processor coupled to the plurality of security sensors, configured to receive sensor signals from each of the plurality of security sensors and configured to manage individual user profiles and their respective access privileges and credentials in the system;
   a normalization module configured to normalize the sensor signal data in accordance with a defined data mapping scheme by mapping the sensor signal data from each security sensor in the native format of each manufacturer to a common format, the common format including a data object and processing information for the sensor signal, the normalization module further configured to generate unique physical access privileges and credentials to exclusively map a user's profile to a spatial hierarchy of physical sites along with security devices of the system, wherein the unique physical access credentials maintain a common representation of the user's identity across the plurality of sites and to associate specific user identities with respective actionable events;
   a visual policy manager having a rules definition component configured to define, at design time, physical security policies in the context of user profiles at all sites through actionable representations of physical, network and information technology resources of the sites, wherein the security policies define standardized rule definitions through visual rules depicted by live objects that contain attributes to define their spatial relationship to the actionable representations, and that are applied to the actionable events normalized to the common format to produce normalized event data; and
   a signal processing component applying, at run time, the defined standardized rules comprising condition-action sequences including relevant transformation and routing rules to the normalized signal data and to invoke the defined responses to the actionable events in order to maintain user profiles and physical security states across the plurality of sites and to resolve the actionable events through the associated specific user identities.

2. The system of claim 1 wherein the plurality of sensors comprise intrusion sensors, physical access sensors, and environmental sensors, and wherein the defined responses comprise at least one of generating an audible alarm, notifying authority personnel, initiating lockdown mode of the site, initiating computer backup and shutdown procedures, and facilitating exit from the site.

3. The system of claim 2 wherein the plurality of sensors are selected from the group consisting of: proximity alarms, infrared detectors, motion sensors, smoke detectors, bar code readers, and biometric sensors, and wherein the native format encompasses native sensor data including text data and binary data represented in the proprietary manufacturer format, and wherein the native sensor data includes at least one of a command or sensor state information.

4. The system of claim 1 wherein the physical security policies comprise rules consisting of virtual objects representing personnel and physical assets of the site and events involving the personnel and physical assets, wherein each rule has an associated action and one rule is applied at a time to the normalized event data in a sequential order dictated by one of a defined rule execution order or a top to bottom order based on event time.

5. The system of claim 4 wherein the rules are constructed using a graphical visual policy editor comprising a web-based online graphical editor, the graphical editor including a drag and drop graphical user interface component that facilitates creation of rules through interconnection of rule objects and definition of rule properties.

6. A system comprising:
   an interface circuit interfacing to a plurality of security sensor types distributed throughout a plurality of sites, each sensor type configured to respond to a corresponding type of actionable event, each sensor type provided by a different manufacturer of a plurality of manufacturers;
   an integration circuit including a processing agent for each type of security sensor to accept sensor data from each security sensor in a native data representation format of each respective manufacturer of the plurality of manufacturers;

a central security management processor coupled to the integration circuit and configured to manage individual user profiles and their respective access privileges and credentials in the system;

a normalization circuit mapping the sensor data from each security sensor in the native data representation format of each manufacturer of the plurality of manufacturers to a common data representation format, the common data representation format including a data object and processing information for the sensor data, the normalization circuit further configured to generate unique physical access privileges and credentials to exclusively map a user's profile to a spatial hierarchy of physical sites along with security devices of the system, wherein the unique physical access credentials maintain a common representation of the user's identity across the plurality of sites and to associate specific user identities with respective actionable events;

a visual policy manager circuit defining, at design time, physical security policies in the context of user profiles at all sites through actionable representations of physical, network and information technology resources of the sites, wherein the security policies define standardized rule definitions through visual rules depicted by live objects that contain attributes to define their spatial relationship to the actionable representations, and that are applied to the actionable events normalized to the common data representation format to produce normalized event data; and a signal processing circuit receiving the normalized event data and applying, at run time, relevant transformation and routing rules comprising condition-action sequences in order to maintain user profiles and physical security states across the plurality of sites and to resolve the actionable events through the associated specific user identities.

7. The system of claim 6 wherein the plurality of sensor types comprise physical access, intrusion, and environmental conditions, and wherein the action events comprise at least one of generating an audible alarm, notifying authority personnel, initiating lockdown mode of the site, initiating computer backup and shutdown procedures, and facilitating exit from the site.

8. The system of claim 6 wherein the normalization module converts the native data representation format for each security sensor into XML (Extensible Markup Language) format, and wherein the native data representation format encompasses native sensor data including text data and binary data represented in a proprietary format, and wherein the native sensor data includes at least one of a command or sensor state information.

9. The system of claim 6 further comprising a rules engine applying defined rules on the data and commands from each security sensor, wherein each rule has an associated action and one rule is applied at a time to the normalized event data in a sequential order dictated by one of a defined rule execution order or a top to bottom order based on event time.

10. The system of claim 6 further comprising a visual editor component representing each normalized physical sensor as an object containing one or more attributes that define a spatial relationship to other objects through one or more defined rules, the visual editor including a drag and drop graphical user interface component that facilitates creation of rules through interconnection of rule objects and definition of rule properties.

11. A method comprising:

interfacing in a centralized security system, a plurality of security sensor types distributed throughout a plurality of sites, each sensor type configured to respond to a corresponding type of actionable event, each sensor type provided by a different manufacturer of a plurality of manufacturers;

accepting sensor data from each security sensor an integration module including an agent for each type of security sensor, wherein the sensor data from each security sensor is embodied in a native data representation format of each respective manufacturer of the plurality of manufacturers;

defining individual user profiles and their respective access privileges and credentials in the system;

mapping the sensor data from each security sensor in the native data representation format of each manufacturer of the plurality of manufacturers to a common data representation format, the common data representation format including a data object and processing information for the sensor data;

generating unique physical access privileges and credentials to exclusively map a defined user profile to a spatial hierarchy of physical sites along with security devices of the system, wherein the unique physical access credentials maintain a common representation of the user's identity across the plurality of sites and to associate specific user identities with respective actionable events;

defining physical security policies of the site in the context of user profiles at all sites through actionable representations of physical, network and information technology resources of the site, wherein the security policies define standardized rule definitions through visual rules depicted by live objects that contain attributes to define their spatial relationship to the actionable representations, and that are applied to the actionable events normalized to the common data representation format to produce normalized event data; and receiving the normalized event data and applying relevant transformation and routing rules comprising condition-action sequences in order to maintain user profiles and physical security states across the plurality of sites and to resolve the actionable events through the associated specific user identities.

12. The method of claim 11 wherein the plurality of sensor types comprise physical access, intrusion, and environmental conditions, and wherein the action events comprise at least one of generating an audible alarm, notifying authority personnel, initiating lockdown mode of the site, initiating computer backup and shutdown procedures, and facilitating exit from the site.

13. The method of claim 11 further comprising converting the native data representation format for each security sensor into XML (Extensible Markup Language) format, and wherein the native data representation format encompasses native sensor data including text data and binary data represented in a proprietary format, and wherein the native sensor data includes at least one of a command or sensor state information.

14. The method of claim 11 further comprising applying, through a rules engine, defined rules on the data and commands from each security sensor, wherein each rule has an associated action and one rule is applied at a time to the normalized event data in a sequential order dictated by one of a defined rule execution order or a top to bottom order based on event time.

15. The method of claim 11 further comprising representing, through a visual editor, each normalized physical sensor as an object containing one or more attributes that define a spatial relationship to other objects through one or more defined rules, the visual editor including a drag and drop graphical user interface component that facilitates creation of rules through interconnection of rule objects and definition of rule properties.

* * * * *